(12) United States Patent
Kragh

(10) Patent No.: US 9,246,850 B2
(45) Date of Patent: Jan. 26, 2016

(54) APPARATUS AND METHOD FOR RECEIVING AND FORWARDING DATA

(75) Inventor: Søren Kragh, Valby (DK)

(73) Assignee: Napatech A/S, Soberg (DK)

( * ) Notice: Subject to any disclaimer, the term of this patent is extended or adjusted under 35 U.S.C. 154(b) by 104 days.

(21) Appl. No.: 13/976,823

(22) PCT Filed: Dec. 27, 2011

(86) PCT No.: PCT/EP2011/074096
§ 371 (c)(1),
(2), (4) Date: Jun. 27, 2013

(87) PCT Pub. No.: WO2012/093056
PCT Pub. Date: Jul. 12, 2012

(65) Prior Publication Data
US 2013/0279509 A1    Oct. 24, 2013

Related U.S. Application Data

(60) Provisional application No. 61/429,663, filed on Jan. 4, 2011.

(51) Int. Cl.
| | |
|---|---|
| *H04L 12/861* | (2013.01) |
| *H04L 12/54* | (2013.01) |
| *H04L 12/801* | (2013.01) |
| *H04L 12/70* | (2013.01) |
| *H04L 12/863* | (2013.01) |

(52) U.S. Cl.
CPC ............ *H04L 49/90* (2013.01); *H04L 12/5693* (2013.01); *H04L 47/10* (2013.01); *H04L 47/6205* (2013.01); *H04L 47/6255* (2013.01); *H04L 2012/5683* (2013.01)

(58) Field of Classification Search
None
See application file for complete search history.

(56) References Cited

U.S. PATENT DOCUMENTS

| | | | |
|---|---|---|---|
| 3,979,733 A * | 9/1976 | Fraser ........................ 710/316 |
| 5,337,308 A | 8/1994 | Fan | |
| 5,870,396 A * | 2/1999 | Abu-Amara ....... H04B 7/18582 370/413 |
| 6,072,772 A * | 6/2000 | Charny et al. ................. 370/229 |
| 6,088,734 A * | 7/2000 | Marin et al. ................... 709/232 |
| 6,091,709 A * | 7/2000 | Harrison et al. ............... 370/235 |
| 6,389,031 B1 | 5/2002 | Chao et al. | |
| 6,459,708 B1 * | 10/2002 | Cox .................... H04L 12/5692 370/463 |
| 6,570,945 B1 | 5/2003 | Ono et al. | |
| 6,647,017 B1 | 11/2003 | Heiman | |
| 2003/0112815 A1 * | 6/2003 | Lee ............... 370/412 |
| 2004/0128401 A1 * | 7/2004 | Fallon et al. ................... 709/250 |
| 2004/0213265 A1 * | 10/2004 | Oueslati et al. .......... 370/395.42 |
| 2005/0281277 A1 * | 12/2005 | Killian .................... H04L 45/22 370/412 |
| 2006/0039393 A1 * | 2/2006 | Firoiu ................. H04L 12/5693 370/412 |
| 2007/0177599 A1 * | 8/2007 | Yazaki et al. ................. 370/392 |
| 2008/0112423 A1 * | 5/2008 | Christenson .................. 370/412 |
| 2009/0097848 A1 * | 4/2009 | Sasak ........................ H04J 3/14 398/52 |
| 2009/0127467 A1 * | 5/2009 | Frach ................... G01T 1/2985 250/363.03 |
| 2009/0181663 A1 | 7/2009 | Hu et al. | |
| 2010/0091748 A1 * | 4/2010 | Endoh ............... H04L 29/06027 370/338 |
| 2010/0172357 A1 * | 7/2010 | Poulin ................ H04L 12/4633 370/395.4 |
| 2012/0008573 A1 * | 1/2012 | Shiva et al. .................... 370/329 |

* cited by examiner

*Primary Examiner* — Mohammad Adham
*Assistant Examiner* — Vladislav Agureyev
(74) *Attorney, Agent, or Firm* — McHale & Slavin, P.A.

(57) ABSTRACT

A method and apparatus adapted to prevent Head-Of-Line blocking by forwarding dummy packets to queues which have not received data for a predetermined period of time. This prevention of HOL may be on an input where data is forwarded to each of a number of FIFOs or an output where data is de-queued from FIFOs. The dummy packets may be provided with a time stamp derived from a recently queued or de-queued packet.

14 Claims, 1 Drawing Sheet

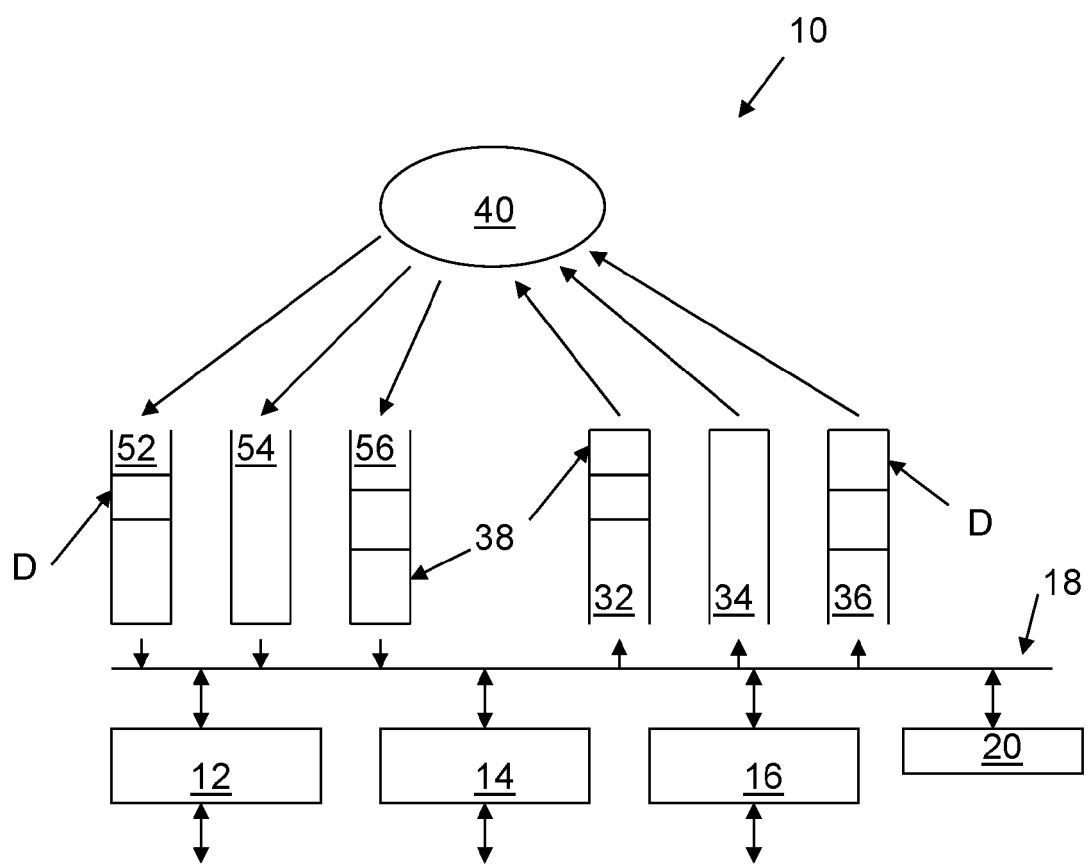

APPARATUS AND METHOD FOR RECEIVING AND FORWARDING DATA

CROSS-REFERENCE TO RELATED APPLICATIONS

This application is a §371 national stage entry of International Application No. PCT/EP2011/074096, filed Dec. 27, 2011, which claims priority to U.S. Provisional Patent Application No. U.S. 61/429,663 filed Jan. 4, 2011, the entire contents of which are incorporated herein by reference.

The present invention relates to an apparatus and method for receiving and forwarding data an in particular to a manner of time ordering data packets received from multiple data sources.

Time ordering may be seen in e.g. U.S. Pat. No. 6,647,017 and U.S. Pat. No. 5,337,308.

A first aspect of the invention relates to a system for forwarding data, the system comprising:
  receiving means for receiving a plurality of data packets and providing a time stamp for each received data packet,
  a plurality of FIFO input queues each having an output end or output storage position,
  forwarding means adapted to represent each received data packet in an input queue,
  means for de-queuing data packets from the input queues, the de-queuing means being adapted to de-queue a packet being represented at the output end/storage position of an input queue and having the lowest time stamp of all packets at the output ends/storage positions of all input queues, the de-queuing means being adapted to only de-queue a packet when each input queue has one or more packets,
the system further comprising generating means for transmitting a dummy packet with a time stamp to an input queue, when no data packet has been forwarded to the pertaining input queue for a predetermined period of time.

In the present context, the system may be monolithic and positioned within a single housing, made of multiple separate circuits/elements or even made of individual circuits or network units scattered over a given area and connected (via wires or wirelessly) to each other via one or more networks, such as or including the WWW, so as to be able to exchange data. This exchange may be under any data transfer protocol, such as TCP, Ethernet, Bluetooth or the like, and using any type of data transfer, wired or wireless. Naturally, the individual means of the system may each be formed by one or more processors, such as FPGAs, ASICs or the like, or a single such processor may form multiple of the means and perform multiple of the steps.

The functionality of the system need not merely be the forwarding of data. Additional processing may, as will be described further below, be performed, such as the analysis of the data packets.

In the present context, the data may be one or more data packets. Data packets may be ordered or grouped into streams, and the data may include one or more such streams.

A data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets. A data packet usually has a number of different information items or types, such as address data, payload or the like, which are each positioned at well defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in the analysis. The type or standard may be derived directly from the data packet, such as when a particular data item of the packet identifies the type/standard, or may be derived from data derived from the data packet, such as on the basis of recognition of types and positions of data items of the data packet and subsequently determination of type(s) or standard(s) of data packet in which such data may be found at such position(s).

Data packets as received may be pre-ordered in a multiple of manners and for a number of reasons. Usually, data exchange between computers is a file transfer, TCP transfer, VoIP or the like, where the order of the individual packets is important. Usually, such transfers are called streams.

A stream of data packets normally is a sequence of data packets transmitted from a single transmitter to one or more receivers. These data packets relate to e.g. a single file or the like transmitted in smaller portions, being the payload of the packets. The transmitter and receiver, or any intermediate network elements, will usually then have addresses also represented in the packet. In addition, other stream identifying information may be present in the data packet, depending on the individual data packet standard.

Thus, a stream may be identified on the basis of e.g. the addresses and/or the stream identifying information, whereby, if used consistently, the same information may be derived, and any subsequent process may identify the stream merely from the information. In another situation, data packets may be provided with information therein determining the order thereof, such as a sequence number or a time stamp. Thus, this information may be used for ordering the packets.

The receiving means may actually receive and/or store the data or data packet. Alternatively, the data packet may be received or stored at another position or in an apparatus with which the receiving/storing apparatus communicates, whereby the data of the data packet is received and then accessed remotely by reading the data while being stored in the other apparatus. The latter will usually provide a slower processing, as the data packet is accessed remotely.

The receiving means usually will be a type of networking element adapted to receive data packets from a network. Thus, this means may have a PHY, a MAC or the like, if Ethernet data packets are to be received. A large number of data protocols are known, but the skilled person will know what receiving means are useful in relation to which protocols. The receiving means may store the data packets or feed these directly there through for further processing/storing/transport. Most often, a buffer is provided to take into account delays, but this is not a requirement.

The receiving means also provides a time stamp for each data packet. Then, the receiving means is adapted to determine a point in time or receipt/access of each data packet and provide corresponding information. In general, any representation of time may be used, such as a standard representation of a time; hour/minute/second. Alternatively, time may be represented in a simpler manner by a number. Naturally, this number may be wrapped around if desired.

As time naturally will change, the time or number is altered, such as incremented/decremented, preferably at equidistant points in time. The passing of the time in a local clock of the individual determining means may be controlled by a periodic signal, which is used for incrementing/decrementing the time/number. This periodic signal may be that derived by the receiving means or may be received thereby from an external unit. One clock may be used for all receiving means, if more than one is used, or the receiving means may each have a clock, where the clocks then are synchronized.

The time stamp may be provided together with the data packet but preferably is provided therein by adding time stamp data to the data packet. Then, any later analysis of the data packet may be performed on the basis of the data packet itself.

According to the invention, a plurality of FIFO input queues are provided. In this context, a First In First Out queue represents e.g. a number of data items/packets having an order. The oldest item/packet being the next to be read out, and new items/packets being added after the latest received item/packet/identifier.

A FIFO may be implemented in a storage having a number of storage positions along a linear order from an input end to an output end, where the packets move from the input end toward the output end and are output from the output end. Usually, a storage has separately addressable elements, and a number of such elements may form a queue. Naturally, the storing unit may be a monolithic storing unit or one composed by a number of storing elements separated in space. Usual storing technologies are based on hard drives, floppy discs, RAM, ROM, PROM, EPROM, EEPROM, Flash, memory cards, CD-ROM, DVD, memory cards, or the like. Naturally, the FIFO may be implemented in e.g. a circular storage, where data/items are not moved but pointers are moved pointing to the input end and the output end.

The queue may hold the actual data packets, or parts thereof, or may be virtual in the sense that only identifiers of the data packets are held in the queue, where the actual data packets are stored elsewhere. If the forwarding means are adapted to forward the data packets, only part of the data packet need be forwarded, as it may save space, if part thereof is not needed and can be discarded. If the data packet is not desired output again, for example, addressing information therein may be deleted in order to not take up space.

This storing/representing may comprise the forwarding means deriving or receiving an address of a storage or the queue in which to store the data. As mentioned, the queue or all queues may be implemented in a storage as e.g. circular buffers, whereby the adding of data to the end of a queue will be adding the data at an address at the end pointer of that queue. This address may be derived by the forwarding means itself or may be received, such as upon request, from a scheduler, an arbiter or other address generating element.

Preferably, the positions of data, such as any pointers used for indicating such data, are maintained also when de-queuing the data, so that updated information is available also to the forwarding means or means generating addresses thereto.

Irrespective of the implementation, the FIFO operation is desired. This FIFO has the advantage that data packets/items added thereto in a desired order, such as in a time order, will maintain that order and thus be output in that order. Therefore, the data packets may be added to any type of storage, as long as they are read out in the order of storing.

If separate storing units are provided, the address will describe both the identity of the actual storing unit and the "local address" therein.

In one embodiment, each receiving means, if more than one is used, is adapted to only forward identifiers/data packets to a sub-group of the queues, where different receiving means forward identifiers/data packets to different sub-groups of the queues. In the situation where more than one receiving element is adapted to forward identifiers/data packets to a queue, it is desired that a scheduler is provided which ensures that the identifiers/data packets in each queue is forwarded in the order dictated by their time stamps. Thus, in one embodiment, these receiving means forward information to the scheduler relating to the time stamps of packets/identifiers for a shared queue, and the scheduler will instruct the pertaining receiving means when the identifier/packet may be represented in that queue.

The de-queuing of data packets from the input queues may be an actual removal of the data packets or parts thereof from the queues. Alternatively, the queue may be virtual in the sense that the data packets need not be forwarded to and removed from a particular storage area, but a queue may be defined by an order of identified data packets without moving these. The queue thus is virtual, and a data packet may be deleted/removed/de-queued by removing the identification thereof from the order of data packets.

In another situation, the queue may be a list, such as a circular list, of data packets or identifiers thereof, where the ends of the queue are identified by e.g. pointers. Thus, the de-queuing may be a shifting of an end pointer from the de-queued packet/identifier to the next.

Thus, the de-queuing means may be means for actually reading or deleting the data packet from the queue. Alternatively, the de-queuing means may operate on a representation of the queue and merely remove the indication of the queue being in the queue.

The queues being FIFO queues, the data packet removed is always that data packet in the queue which was received the earliest.

According to the invention, the de-queuing means is adapted to de-queue the data packets one at the time. The de-queuing means only de-queues a data packet, if all queues hold one or more data packets.

Also, the de-queuing means de-queues that packet which has the lowest time stamp. In this respect, it is remembered that only the first or top data packets are looked at. Also, it is noted that the time stamp may be an integer of an interval of integers, whereby the time stamp may "wrap around", so that the highest integer may, in fact, be seen as being lower than the lowest integer.

In this manner, it is ensured that a data packet with a higher time stamp cannot overtake a data packet with a lower time stamp, if the lower time stamp data packet is to be fed to another queue but is delayed, so that this queue is empty, when the latter packet arrives for de-queuing.

It is noted that different strategies may be selected for selecting a queue for a data packet, such as priority of the data packets. Therefore, a queue may "legally" be empty for any period of time, and this should not be allowed to stall the process.

However, systems of this type may experience what is known as Head-Of-Line blocking (HOL blocking) in that an empty queue will make the process stall.

In order to prevent this type of blocking, generating means are provided which transmits a dummy packet to a queue to which no packets have been transmitted for a predefined period of time.

Thus, if a queue is empty and thus stalls the system, this situation is ended by the generating means transmitting a dummy packet to that queue, where after the de-queuing means will act thereon and thus commence with the de-queuing.

In this respect, the de-queuing means treats the dummy packets and data packets equally, even though it may, subsequent to de-queuing, treat the two types of data packets differently.

In this respect, the adding and de-queuing of a dummy packet to a queue may be performed as the adding and de-queuing of data packets to the queues. It is noted, however, that the only relevant part of the dummy packet may be the time stamp, whereby a dummy packet may take up very little space in a queue.

In the present context, a dummy packet need no other information than the time stamp. Naturally, if the de-queuing means is adapted to read e.g. address data from the de-queued packets and act thereon, it may be desired to provide the dummy packet also with address data. Also, the dummy packet may be added other data, such as link information or the like, if the dummy packet when de-queued is fed to other circuits which may benefit from this data. Usually, the dummy packet will not be provided with data relating to the data packets of the queue but may be provided with data, such as queue length, relating to the queue into which it was placed.

Preferably, the time stamp of a dummy packet is the actual point in time of generation of the dummy packet. Alternatively, an earlier point in time, such as the actual point in time subtracted the predetermined period of time, may be used. Alternatively, a later point in time may be used. It should, however, be kept in mind that it is desired that all packets in a queue are positioned therein in the order of their time stamps.

Naturally, the predetermined period of time may be selected as desired. A shorter period of time will allow stalls of the process to be smaller, but then more dummy packets are forwarded and more bandwidth thus consumed. A longer period of time will reduce the used bandwidth but allow the stalls to take longer. The period of time may be determined in relation to any maximum processing delay in a receiving means, so that when this time has elapsed, it is ensured that all earlier packets are represented in the queues, and the dummy packet may then be generated.

This de-queuing methodology including the dummy packets thus may be used for correcting any differences in delay between the receiving means and the queues or even prior to the receipt of the data packets. This may be reflected in the period of time allowed to lapse, before the dummy packet is generated.

In one embodiment, a single receiving means is used. In this respect, the dummy packets may be generated by the receiving means, as it is in control of data packet forwarding to all input queues.

In a preferred embodiment, however, the receiving means comprises a plurality of physically separate receiving circuits each being adapted to receive a plurality of data packets and provide a time stamp for each received data packet, each receiving circuit comprising a generating means.

When multiple receiving means are provided, the system becomes more versatile in that more or less such receiving means may be provided to adapt the capabilities of the system.

However, in this situation, the dummy packets may be generated by the individual receiving means. Thus, if a receiving means notices that it has not forwarded a packet to a given input queue for the predetermined period of time, it may forward a dummy packet irrespective of whether other receiving means have forwarded data packets or dummy packets.

In another embodiment, a scheduler is provided for ensuring that the data packets forwarded to the individual input queues from multiple receiving means are forwarded in the correct order. This scheduler may also be used for generating the dummy packets in that it may monitor all data packet transfer to all input queues and thus generate a single dummy packet to a starving queue and only when this input queue has received no data packets from any receiving means during the predetermined period of time.

Alternatively the scheduler may instruct a receiving means to generate and forward the dummy packet to the starving input queue. In this respect, any receiving means may be used, such as a receiving means that is the least busy of the receiving means. The "degree of busyness" for the receiving means may be decided from the number of requests for transfer of data packets from the receiving means to the queues from the individual receiving means.

Naturally, if each receiving means forwards data packets to input queues not receiving data packets from other receiving means, no scheduler is required as, as in the situation with only one receiving means, the receiving means may itself ensure the correct ordering of the packets in the queues and the generation of dummy packets.

When, however, multiple receiving means are provided which each is adapted to time stamp received data packets, it is desired that the time stamps are coordinated. Thus, it is desired that the receiving means all receive a common clocking signal so that the time stamping is coordinated. Alternatively or in addition, each receiving means may comprise a local clock where all such clocks are synchronized.

In one embodiment, the de-queuing means are adapted to discard dummy packets. Thus, the de-queuing means will not output such dummy packets. On the other hand, the de-queuing means may be adapted to output the de-queued data packets which now will be output in the order of their time stamps irrespective of which input queue they were fed to.

These output data packets may be output for any type of use, such an analysis thereof. The data packets are now ordered according to their time of arrival, whereby the analysis of e.g. streams of data packets is facilitated.

After this analysis, or simply after de-queuing, the data packets may be output from the system in any desired manner. It may, for example, be desired output to the same data transmission link(s)/cable(s) or even port as the packets were received from and in the same time order. In this situation, the present system may be transparent or invisible on that communication link.

In one embodiment, the system further comprises a plurality of FIFO output queues each having an output end or storage position, the de-queuing means being adapted to forward data packets de-queued from the input queues to one or more of the output queues in the order of de-queuing from the input queues.

These output queues may be positioned in a common storage, such as a storage also implementing the input queues and/or may be implemented in the receiving means. A system may be used where small queues are present in the receiving means from where the data packets are de-queued, and where larger queues are present in another storage from where the queues in the receiving means are fed.

Naturally, not all received or de-queued data packets need be forwarded to the output queues. In some situations, packet dropping may be desired and allowable, if congestion is experienced. Packet dropping is a usual activity, and this may not even affect the transparency/invisibility of the present system.

The data packets forwarded to the output queues are forwarded thereto in the order of de-queuing from the input queues and thus in the order of their time stamps. Therefore, the de-queuing and any analysis or the like performed upon the de-queued data packets will not re-order the data packets.

Thus, in this manner, as is the case with the input queues, the data packets in the individual output queues are ordered by their time stamp values.

In one embodiment, the de-queuing means de-queues packets from an input queue only to output queues not receiving packets from other input queues. In that situation, dummy packets from that input queue may be copied to all such output queues.

In another embodiment, the de-queuing means is adapted to derive a time stamp from a de-queued data packet, generate a dummy packet, provide the dummy packet with the derived time stamp and forward the dummy packet to an output queue to which no de-queued data packets have been forwarded for at least a predetermined period of time.

This is advantageous as the de-queuing means may not itself be able to generate a reliable time stamp, whereby it is much easier to copy one from a recently de-queued package (data or dummy), such as a package forwarded to an output queue immediately before or to be forwarded immediately after the newly generated dummy packet. Naturally, the time stamp of the newly generated dummy packet may be that of any 2, 4, 6, 8, 10 or 50 newly de-queued packets.

In a particular situation, pairs of queues exist comprising one input queue and an output queue, the queues of the pairs being non-overlapping, where the de-queuing means is adapted to feed data packets de-queued from the input queue of a pair to the output queue of the pair, the de-queuing means additionally being adapted to feed any dummy packets from the input queue of the pair to the output queue of the pair.

That pairs are non-overlapping means that each input queue and each output queue is a member of only one pair, if any.

Then, data packets and dummy packets de-queued from the input queue of a pair may be fed to the corresponding output queue of the pair. Again, packet dropping may be allowed, so there need not be a total correspondence between the packets in the input queue and in the output queue, but the ordering of the packets in the output queue of the pair will be the same as the ordering in the input queue of the pair.

In general, the use of dummy packets in output queues is interesting when the system further comprises an output de-queuing means for de-queuing data packets and dummy packets from the output queues, the output de-queuing means being adapted to de-queue a packet being at the output end/storage position of an output queue and having the lowest time stamp of all packets at the output ends/storage positions of all output queues, the output de-queuing means being adapted to only de-queue a packet when each output queue has one or more packets.

Thus, when the contents of the output queues (apart from any dropped packets) can be identical to those of the input queues, and when the de-queuing takes place in the same manner, the same HOL blocking may be seen. This, however, is automatically prevented by the dummy packets also being fed to the output queues and actually to the output queues which would otherwise be starving.

In this situation, the de-queuing of the output queues may differ in that de de-queuing may be performed within sub-groups of the output queues, where the de-queuing of one sub-group may be independent of that of another sub-group. This may be the situation when different sub-groups of output queues are de-queued to different outputs, such as different receiving means.

Naturally, dummy packets may, as in relation to the input queues, be generated for any output queues irrespective of what strategy/plan is used for feeding the de-queued packets to the output queues and whether these are actually fed thereto in time order. Then, any processor de-queuing and/or analyzing the de-queued data packets may generate the dummy packets by e.g. copying the time stamp of another packet as described above. Alternatively, a separate unit or element may be used for monitoring the output queues and generate dummy packets if required.

A second aspect of the invention relates to a method of receiving and forwarding data, the method comprising:
receiving a plurality of data packets and providing a time stamp for each individual received data packet,
representing each received data packet in one or more of a plurality of FIFO input queues each having an output end or storage position,
de-queuing a data packet from the input queues, the de-queuing comprising de-queuing a packet having the lowest time stamp of all packets at the output ends/storage positions of all input queues, the de-queuing only being performed when each input queue has one or more packets,
the method further comprising transmitting a dummy packet with a time stamp to an input queue, when no data packet has been forwarded to the pertaining input queue for a predetermined period of time.

Usually, the receiving step will comprise receiving the data packets from a data cable or link. This data transport may be performed using any desired protocol and any desired technology, such as wireless (Bluetooth, WLAN, WAN, infrared communication or the like) or wired (Ethernet for example) or the like.

The time stamping may be on the basis of a local clock or a received clocking signal.

The representing step may comprise actually forwarding the data packet or part thereof to the queue. Alternatively, a virtual queue may be used merely receiving an identifier of the packet which then may be stored elsewhere.

Similarly, the de-queuing step may comprise actually reading/removing the data packet from the queue in the situation where the queue actually holds the data packet and where the data packet is required elsewhere after de-queuing. Alternatively, the de-queuing of the packet may be virtual in the removal of an identifier of the packet in the queue.

The queue may be implemented in e.g. a circular list where the de-queuing of the data packet or its identifier may simply be the altering of a position, such as a pointer, denoting a limit between taken-up positions in the queue and free positions so that this data packet or identifier will subsequently be overwritten with other data.

The de-queuing step may comprise merely reading and then discarding the data packets. Alternatively, the de-queued data packets may be output by or further analyzed by the de-queuing means which may then be any type of processor, server, cluster of processors or the like. Then, the de-queuing means may have its own storage etc. in order to be able to perform the tasks required.

The transmitting step may comprise a central transmission, whereby only a single generating means may be required, or multiple generating means may be provided. In one situation, a generating means is provided in each receiving means. In that situation, and when multiple receiving means are adapted to transmit received data packets to the same queues, multiple dummy packets may be forwarded to a queue, if it has not received packets from multiple receiving means during the predefined period of time. This, however, need not be a problem in that the de-queuing means may discard the dummy packets and in that the absence of data packets to that queue will automatically provide bandwidth so that the transmission of the dummy packets is not a limiting factor.

In one embodiment, the receiving step comprises a plurality of physically separate receiving circuits each receiving a plurality of data packets and providing a time stamp for/to each individual received data packet. Then, each receiving circuit may be able to perform the step of transmitting the dummy packet, either on the basis of its own determination of the fact that an input queue has not received a data packet for a predetermined period of time or as instructed by e.g. a scheduler having performed that determination. This scheduler may also be used for ensuring that data packets from multiple receiving means to the same input queue are forwarded in the correct order. Also, the separate receiving circuits may each have a clock. In that situation, it is desired that the clocks are synchronized. Synchronization of such clocks is known to the skilled person.

In this respect, it may be desired that each receiving means is adapted to transmit dummy packets to at least the queue(s) to which the receiving means is adapted to feed identifiers/data packets.

In one embodiment, the de-queuing step comprises discarding dummy packets. In this manner, bandwidth is saved at the de-queuing or any later forwarding or analysis, if these dummy packets or any information therein is not required later on.

In one embodiment, the de-queuing step comprises forwarding data packets de-queued from the input queues to one or more of a plurality of FIFO output queues, each having an output end or storage position, in the order of de-queuing from the input queues.

In this situation, the de-queuing means may generate dummy packets to be forwarded to output queues not having received packets for a predetermined period of time. In this situation, the de-queuing step could comprise deriving a time stamp from a de-queued data packet, generating a dummy packet, providing the dummy packet with the derived time stamp and forwarding the dummy packet to an output queue to which no de-queued data packets have been forwarded for at least a predetermined period of time.

In that embodiment, it may also be preferred that pairs of queues exist comprising one input queue and an output queue, the queues of the pairs being non-overlapping, where the de-queuing step comprises feeding data packets de-queued from the input queue of a pair to the output queue of the pair, the de-queuing step additionally comprises feeding any dummy packets from the input queue of the pair to the output queue of the pair.

It is noted that in the situation where packets from one input queue are de-queued to output queues not receiving packets from other input queues, a dummy packet from the input queue may be copied to all such output queues.

Then, the method may further comprise the step of de-queuing data packets and dummy packets from the output queues by de-queuing a packet being at the output end/storage position of an output queue and having the lowest time stamp of all packets at the output ends/storage positions of all output queues, the de-queuing of data packets from the output queues only being performed when each output queue has one or more packets.

In the following, preferred embodiments of the invention will be described with reference to the drawing, wherein FIG. 1 illustrates a preferred embodiment according to the invention.

In FIG. 1, a system 10 is illustrated in which a number of analyzers 12, 14 and 16 receive data packets from any source or sources, such as a network, the WWW or the like.

The analyzers 12/14/16 time stamp these data packets and forward each data packet, or at least part thereof, via a bus 18, to one or more of the queues 32/34/36. The packet (or part thereof) is stored in the queue with its time stamp.

The time stamp may be provided to the data packet or transmitted together with—but not in—the data packet.

It is noted that the same functionality may be obtained when forwarding an identifier of the data packet with time stamp to the queue and thus not actually transferring/copying the data packet.

From the queues 32/34/36, the data packets (or parts thereof) 38 are de-queued by a processor 40 which may perform any desired analysis of these packets (or parts thereof), and output these if desired.

The time stamping of the data packets in the analyzers 12/14/16 is performed using synchronized, individual clocks (not illustrated) in the analyzers. Alternatively, a global clocking signal may be forwarded to the analyzers 12/14/16, or a combination may be preferred.

In the present embodiment, it is desired that the processor 40 receives/de-queues the data packets 38 in the same time order as they were received and time stamped.

In order to ensure this, the processor 40 will de-queue that packet from the queues 32/34/36 which has the lowest time stamp, but it will only de-queue a packet, when at least one packet is present in each queue 32/34/36.

Therefore, each analyzer 12/14/16 will keep track of, for each queue 32/34/36, when it forwarded a data packet (or part thereof) to that queue 32/34/36, and if a predetermined period of time has been exceeded, a dummy packet D will be forwarded to that queue with a time stamp corresponding to the point in time of transmission thereof.

A scheduler 20 may be used for ensuring the ordering of the packets 38/D in the individual queues 32/34/36, if an analyzer 12/14/16 informs the scheduler 20 to which queues 32/34/36 it wishes to transmit packets, and the time stamps thereof. After this, the scheduler 20 is able to arbitrate and order the packets 38/D by instructing the analyzers 12/14/16 to feed the packets 38/D to the queues 32/34/36 in the correct order.

In a simple embodiment, each analyzer 12/14/16 transmits data packets only to one or some of the queues 32/34/36, and different analyzers 12/14/16 transmit data packets to different queues. Then, the scheduler 20 may not be needed, and the bus 18 may be replaced by individual data connections from the analyzers 12/14/16 to the pertaining queues 32/34/36.

Using the dummy packets, it is ensured that any head-of-line blocking of the system only persists for the predetermined period of time, where after all packets in the queues (which will have an earlier time stamp) can be de-queued. If a queue 32/34/36 has several dummy packets D, such as from multiple analyzers 12/14/16, this is not problematic, as these packets D will be de-queued in the correct order, will prevent head-of-line blocking and will not take up excess bandwidth on the links between the queues 32/34/36 and on the one side the analyzers 12/14/16 and on the other side the processor 40 in that these links preferably should be able to carry the full bandwidth possible and in that the presence of the dummy packets D is a sign of the number of packets forwarded to these queues 32/34/36 being low.

Thus, the use of dummy packets in this type of de-queuing will help take into account any differences in delays from the analyzers 12/14/16 to the queues 32/34/36, such as over the bus 18. Also, delays in the analyzers 12/14/16 (after time stamping) is taken into account.

An alternative solution may be one wherein the scheduler 20 itself generates and forwards dummy packets to the starving input queues 32/34/36 or instructs an analyzer 12/14/16, such as a non-busy analyzer, to do so.

Naturally, the processor 40 may discard the dummy packets D in order to not spend bandwidth on the processing of these, but it may be desired to actually feed these dummy packets D through the processor 40, when it is desired to also output the de-queued data packets 38 from the processor 40.

When the processor 40 de-queues the data packets 38 in the order of arrival (time stamp), it may output the data packets in the same order to one or more output queues 52/54/56.

These output queues 52/54/56 may be positioned in a common storage, such as the same storage as the input queues 32/34/36 and/or they may be provided in the analyzers 12/14/16. In one embodiment, small queues are provided in the analyzers and larger ones in another storage from where data packets are fed to those in the analyzers from where the de-queuing takes place before outputting the data packets from the analyzers. Then, the de-queuing within one analyzer is independent of that of another analyzer.

As is the situation at the input queues 32/34/36, dedicated links may be used between the processor 40 and the queues 52/54/56, or it is possible to use a bus corresponding to the bus 18 using a scheduler similar to the scheduler 20, or via the bus 18 using the scheduler 20.

Now, the data may be de-queued from the output buffers in the same manner, i.e. that a packet is only de-queued, if no queues are empty, and the data packet with the lowest time stamp is de-queued. At this level, the dummy packets D are usually discarded.

In one situation, a correspondence exists between pairs of an input bus 32/34/36 and an output bus 52/54/56, so that packets 38/D received from the input bus of a pair are output to the output bus of the pair. In that situation, the dummy packets D may be re-used, i.e. fed through the processor to the output ports, in that the queue filling pattern at the input ports will be duplicated to the output ports.

In a particular embodiment, it is desired that the data output of an analyzer 12/14/16 is identical to that received, meaning that the order of data packets output is identical to the order of the data packets output. Naturally, data packets may be dropped, if a processor or the like becomes too busy, but the packets output are ordered in the order of receipt.

This embodiment may be for uses where the system is to be "transparent", i.e. that the computers outputting/receiving the packets are not able to ascertain that the packets are intercepted and analyzed.

In a more generic embodiment, there is no correspondence between the input and output queues, so that the processor 40 may decide to forward an analyzed data packet 38 to any output queue 52/54/56. In this embodiment, the processor 40 preferably discards the dummy packets D de-queued from the input queues 32/34/36 but generates new dummy packets D for use in the output queues 52/54/56 in the same manner, i.e. that if the processor 40 has not forwarded data packets 38 to a queue for a predetermined period of time, a dummy packet D is fed to that queue in order to prevent head-of-line blocking. This new dummy packet may have a time stamp copied from another recently de-queued or processed packet.

Then, the packets 38/D of the output queues 52/54/56 may be de-queued in time order, the dummy packets D may be discarded, and the data packets 38 may be output in any manner desired.

In the special case where packets from an input queue are forwarded to output queues not receiving packets from other input queues, a dummy packet from the input queue may be copied to all such output queues.

Naturally, the individual queues may be embodied in any suitable manner, and especially in the embodiment where pairs of an input and an output queue are formed, a single memory may be used to form both queues of a pair. This memory may be a circular memory holding all data/dummy packets of the queues, where pointers are used for describing which packets are in the input queue, which packets are in the output queue and which storage locations in the circular memory are empty. Thus, the de-queuing of data packets from the input queue to the processor 40 may be a transmission of the data packet to the processor 40, or the processor 40 simply reading the data packet in the memory. Also, the "feeding" of data packets from the processor 40 to the output queues 52/54/56 may then be the transmission of instructions to the memory or controller thereof to simply either move the data packet within the memory or, even simpler, re-direct a pointer therein to indicate that the data packet is now part of the output queue.

Naturally, any number of queues may be used for the—or each—processor. Such queues may also be prioritized, or data packets with different priority or contents may be fed to different queues. Thus, if congestion is seen, it will be possible to simply drop packets 38 in a lower prioritized queue or data packets of a type transmitted to a particular queue. This will not destroy the time ordering while reducing the bandwidth requirements and thus dissolving the congestion.

In one embodiment, multiple processors are used which each have their own input queues (corresponding to 32/34/36) which may be fed via the bus 18 using the scheduler 20 or may be fed, if desired, via dedicated links, from the analyzers 12/14/16 or other analyzers (not illustrated). In this situation, the multiple processors may either discard the analyzed packets or feed the data packets to the output queues (corresponding to queues 52/54/56) a bus corresponding to the bus 18 using a scheduler similar to the scheduler 20, or via the bus 18 using the scheduler 20. Each processor may output data packets to queues to which the other processors do not output packets, or multiple processors may be able to output packets to the same queue(s).

Naturally, the analyzers 12/14/16 need not analyze the packets at all. Alternatively, they may perform any desired analysis and may add information relating to any analysis performed or a result thereof to the data packets for later use. Alternatively, the information/results may be forwarded with the data packet and not therein.

In one situation, the processor 40 may perform an analysis of the data packet(s). This analysis may be any desired analysis, such as an analysis of a group of data packets relating to e.g. the same flow of data. This analysis may be based on any information relating to a pre-processing performed in the analyzers 12/14/16 and provided with or in the data packets.

In another situation, the processor has no other function than merely de-queuing the data packets and thus merely acts to output the de-queued packets (data packets 38 and dummy packets D if not discarded) in the time order obtained by the above method of de-queuing.

It is noted that the present time stamping and time information may be based on any desired representation of time. The time may be a real time received from the outside world or may be a local time used by the system. The time may be absolute or relative.

Preferably, the time is relative and represented by an integer within a predetermined integer range. The integer wraps around when the maximum value has been reached. This integer is incremented regularly and with a predetermined frequency which is selected appropriately in relation to the maximum frequency of receipt of data packets, which means the data rate or bandwidth of receipt of data packets and the minimum data packet size. It is desired that two packets cannot be received by the same analyzer 12/14/16 within the same time slot.

The invention claimed is:

1. A system for forwarding data, the system comprising:
   receiving means for receiving a plurality of data packets and providing a time stamp for each received data packet,
   a plurality of FIFO input queues each having an output end or output storage position,
   forwarding means adapted to represent each received data packet in an input queue,
   means for de-queuing data packets from the input queues, the de-queuing means being adapted to de-queue a packet being represented at the output end/storage position of an input queue and having the lowest time stamp of all packets at the output ends/storage positions of all input queues, the de-queuing means being adapted to only de-queue a packet when each input queue has one or more packets,
   the system further comprising generating means for transmitting a dummy packet with a time stamp to an input queue, when no data packet has been forwarded to the pertaining input queue for a predetermined period of time.

2. A system according to claim 1, wherein the receiving means comprises a plurality of physically separate receiving circuits each being adapted to receive a plurality of data packets and provide a time stamp for each received data packet, each receiving circuit comprising a generating means.

3. A system according to claim 1, wherein the de-queuing means are adapted to discard dummy packets.

4. A system according to claim 1, further comprising a plurality of FIFO output queues each having an output end or storage position, the de-queuing means being adapted to forward data packets de-queued from the input queues to one or more of the output queues in the order of de-queuing from the input queues.

5. A system according to claim 4, wherein the de-queuing means is adapted to derive a time stamp from a de-queued data packet, generate a dummy packet, provide the dummy packet with the derived time stamp and forward the dummy packet to an output queue to which no de-queued data packets have been forwarded for at least a predetermined period of time.

6. A system according to claim 4, wherein pairs of queues exist comprising one input queue and an output queue, the queues of the pairs being non-overlapping, where the de-queuing means is adapted to feed data packets de-queued from the input queue of a pair to the output queue of the pair, the de-queuing means additionally being adapted to feed any dummy packets from the input queue of the pair to the output queue of the pair.

7. A system according to claim 6, further comprising an output de-queuing means for de-queuing data packets and dummy packets from the output queues, the output de-queuing means being adapted to de-queue a packet being at the output end/storage position of an output queue and having the lowest time stamp of all packets at the output ends/storage positions of all output queues, the output de-queuing means being adapted to only de-queue a packet when each output queue has one or more packets.

8. A method of receiving and forwarding data, the method comprising:
   receiving a plurality of data packets and providing a time stamp for each individual received data packet,
   representing each received data packet in one or more of a plurality of FIFO input queues each having an output end or output storage position,
   de-queuing a data packet from the input queues, the de-queuing comprising de-queuing a packet having the lowest time stamp of all packets at the output ends/storage positions of all input queues, the de-queuing only being performed when each input queue has one or more packets,
   the method further comprising transmitting a dummy packet with a time stamp to an input queue, when no data packet has been forwarded to the pertaining input queue for a predetermined period of time.

9. A method according to claim 8, wherein the receiving step comprises a plurality of physically separate receiving circuits each receiving a plurality of data packets and providing a time stamp for/to each individual received data packet, each receiving circuit being able to perform the step of transmitting the dummy packet.

10. A method according to claim 8, wherein the de-queuing step comprises discarding dummy packets.

11. A method according to claim 8, wherein the de-queuing step comprises forwarding data packets de-queued from the input queues to one or more of a plurality of FIFO output queues, each having an output end or storage position, in the order of de-queuing from the input queues.

12. A method according to claim 11, wherein the de-queuing step comprises deriving a time stamp from a de-queued data packet, generating a dummy packet, providing the dummy packet with the derived time stamp and forwarding the dummy packet to an output queue to which no de-queued data packets have been forwarded for at least a predetermined period of time.

13. A method according to claim 11, wherein pairs of queues exist comprising one input queue and an output queue, the queues of the pairs being non-overlapping, where the de-queuing step comprises feeding data packets de-queued from the input queue of a pair to the output queue of the pair, the de-queuing step additionally comprises feeding any dummy packets from the input queue of the pair to the output queue of the pair.

14. A method according to claim 13, further comprising the step of de-queuing data packets and dummy packets from the output queues by de-queuing a packet being at the output end/storage position of an output queue and having the lowest time stamp of all packets at the output ends/storage positions of all output queues, the de-queuing of data packets from the output queues only being performed when each output queue has one or more packets.

* * * * *